United States Patent [19]
Narayanan et al.

[11] Patent Number: 5,689,664
[45] Date of Patent: Nov. 18, 1997

[54] INTERFACE SHARING BETWEEN OBJECTS

[75] Inventors: Raman Narayanan, Bellevue; Cory Alan Reina, Kirkland, both of Wash.

[73] Assignee: Microsoft Corporation, Redmond, Wash.

[21] Appl. No.: 423,643

[22] Filed: Apr. 14, 1995

[51] Int. Cl.$^6$ .................................................. G06F 3/100
[52] U.S. Cl. ................................... 395/340; 395/335
[58] Field of Search ................................ 395/155, 157, 395/161, 340, 326, 332, 342, 335

[56] References Cited

U.S. PATENT DOCUMENTS

| | | | |
|---|---|---|---|
| 5,559,948 | 9/1996 | Bloomfield et al. | 395/157 |
| 5,561,757 | 10/1996 | Southgate | 395/157 |

OTHER PUBLICATIONS

"Drag & Drop and the Clipboard," *Object Linking & Embedding*, OLE 2.01 Design Specification, Microsoft OLE2 Design Team, Sep. 27, 1993, pp. 293–309.

*Primary Examiner*—Phu K. Nguyen
*Assistant Examiner*—Cliff N. Vo
*Attorney, Agent, or Firm*—Jones & Askew, LLP

[57] ABSTRACT

A system for sharing an interface between objects is described herein that saves significant mounts of system resources, such as memory, in an object oriented system. The interface shared by the system described herein is an interface containing methods that perform a drag and drop operation. In addition, since one instance of the interface is shared among multiple objects, the system centralizes the processing performed by the methods of the interface. This centralization includes centralizing storage and state information associated with the processing of the methods of the interface, thereby further reducing utilization of system resources. The centralized processing occurs in a system where operations are performed on objects in a distributed manner (i.e., on an object-by-object basis). In other words, in a system where operations are typically performed on an object-by-object basis, the system described herein saves system resources by providing a mechanism for centralizing the processing of operations that are to be performed on multiple objects.

25 Claims, 11 Drawing Sheets

INTERFACE SHARING BETWEEN OBJECTS

TECHNICAL FIELD

The present invention relates generally to data processing systems and, more particularly, to sharing an instance of an interface between objects.

BACKGROUND OF THE INVENTION

Following is an overview of object-oriented techniques that, in some cases, is specific to the C++ programming language. Two common characteristics of object-oriented programming languages are support for data encapsulation and data type inheritance. Data encapsulation refers to associating functions with data. Inheritance refers to the ability to declare a data type in terms of other data types. Thus, inheritance provides for a hierarchy of data types where the data types that are defined lower in the hierarchy share the structure or behavior of the data types that are higher in the hierarchy. In the C++ programming language, data encapsulation and inheritance are supported through the use of classes. A class is a defined type. A class declaration describes the data members and function members of the class. A function member is also referred to as a method of a class. The data members and function members of a class are bound together in that the function members operate on a particular instance of the data members of the class. An instance of a class is also called an object of the class. Thus, a class provides a definition for a group of objects with similar properties and common behavior.

To allocate storage for an object of a particular type (class), an object is instantiated. The term "instantiating" refers to allocating memory for data members and associating the data members with the member functions. Once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual allows the function to be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before an object of that class can be instantiated. A class which contains at least one pure virtual function member is an abstract class.

FIG. 1 is a block diagram illustrating typical data structures used to represent an object. An object comprises instance data (data members) and function members, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. In the following, an object will be described as an instance of a class as defined by the C++ programming language. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class implementation at compile time. An interface is a named set of logically related function members ("methods") and data members ("properties"). In C++, an interface is implemented as an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

Utilizing the above-described object-oriented techniques, some object-oriented systems have been developed. However, these object-oriented systems tend to use significant mounts of system resources, such as memory, which tends to slow down the overall system performance. Therefore, it is desirable to discover techniques that conserve system resources in an object-oriented system.

SUMMARY OF THE INVENTION

The system described herein saves significant amounts of system resources, such as memory, in an object-oriented system by sharing an instance of an interface between multiple objects. The interface shared by the system described herein is an interface containing methods that perform a drag and drop operation. In addition, since one instance of the interface is shared among multiple objects, the system centralizes the processing performed by the methods of the interface, thereby further reducing utilization of system resources. This centralization includes centralizing storage and state information associated with the processing of the methods of the interface. The centralized processing occurs in a system where operations are performed on objects in a distributed manner (i.e., on an object-by-object basis). In other words, in a system where operations are typically performed on an object-by-object basis, the system described herein saves system resources by providing a mechanism for centralizing the processing of operations that are to be performed on multiple objects.

In accordance with a first aspect of the present invention, a method is performed in a computer system having a source object, a plurality of destination objects for receiving data from the source object, and an interface with function members for transferring the data. This method is performed under the control of the computer system and comprises the following steps: creating an instance of the interface that is shared by the destination objects, receiving a request to transfer the data from the source object to an identified one of the destination objects, and transferring the data from the source object to the identified destination object utilizing the function members of the instance of the interface.

In accordance with a second aspect of the present invention, a data processing system is disclosed. The data processing system of the second aspect of the present invention comprises a registry having entries that store references to windows and references to instances of an interface, where the interface has function members for transferring data. Further, the data processing system comprises an application program for displaying a plurality of windows. The application program additionally comprises a first component for creating an instance of the interface and a second component for creating an entry in the registry for each of the plurality of windows of the application program. Each entry in the registry contains a reference to one of the plurality of windows and a reference to the instance of the interface.

DETAILED DESCRIPTION OF THE INVENTION

The preferred embodiment of the present invention saves significant amounts of system resources, such as memory, in an object oriented system by sharing an instance of an implementation of an interface between multiple objects. In addition, since one instance of the implementation of the interface (hereafter "instance of the interface") is shared among multiple objects, the preferred embodiment of the present invention centralizes the processing performed by the methods of the interface. This centralization includes centralizing storage and state information associated with the processing of the methods of the interface, thereby further reducing utilization of system resources. The centralized processing occurs in a system where operations are performed on objects in a distributed manner (i.e., on an object-by-object basis), such as the object linking and embedding (OLE) system available from Microsoft Corporation of Redmond, Wash. In other words, in a system where operations are typically performed on an object-by-object basis, the preferred embodiment of the present invention saves system resources by centralizing the processing of operations that are to be performed on multiple objects.

OVERVIEW

Figure 1:
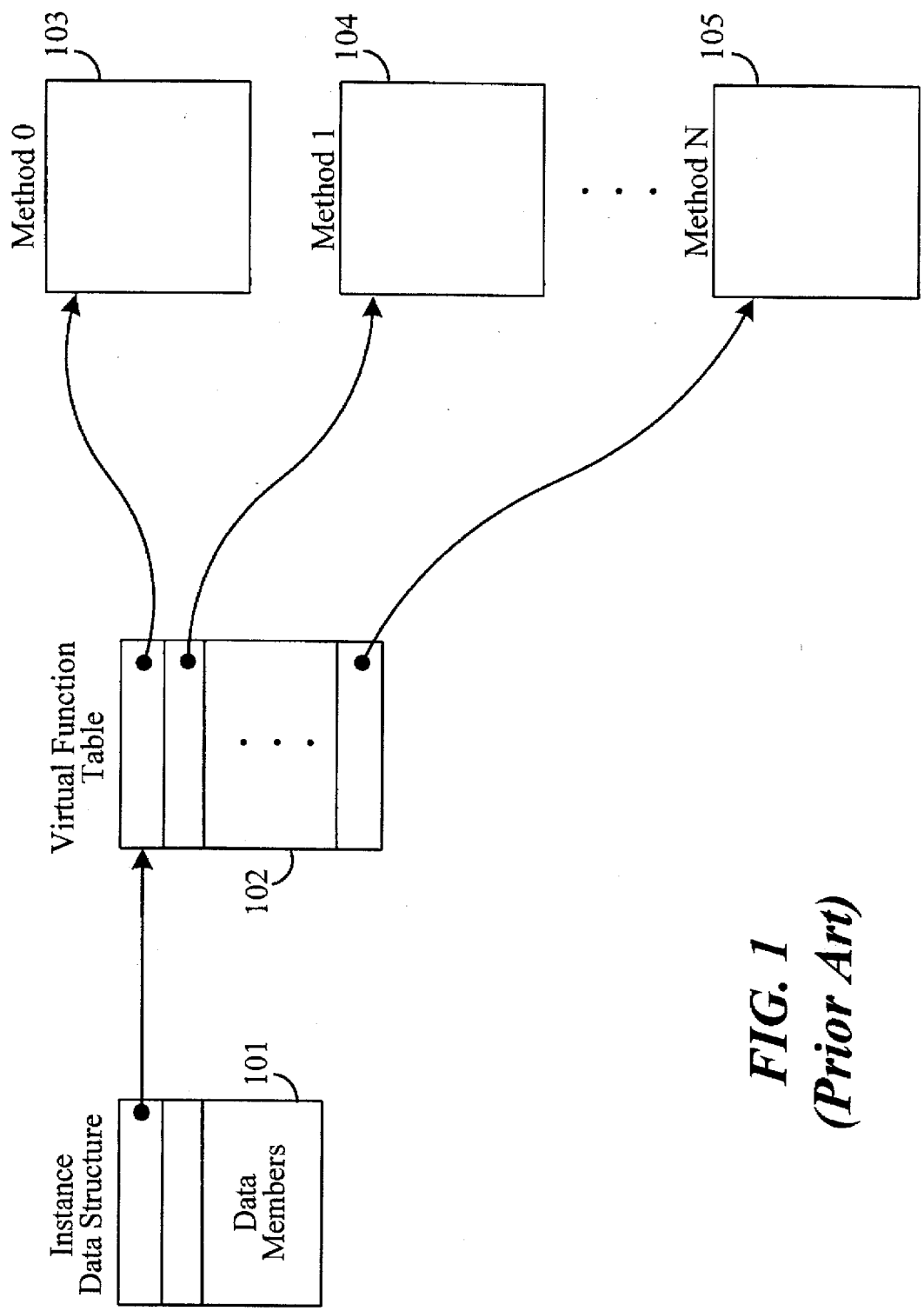
FIG. 1 is a block diagram illustrating conventional data structures used to represent an object.
Figure 2:
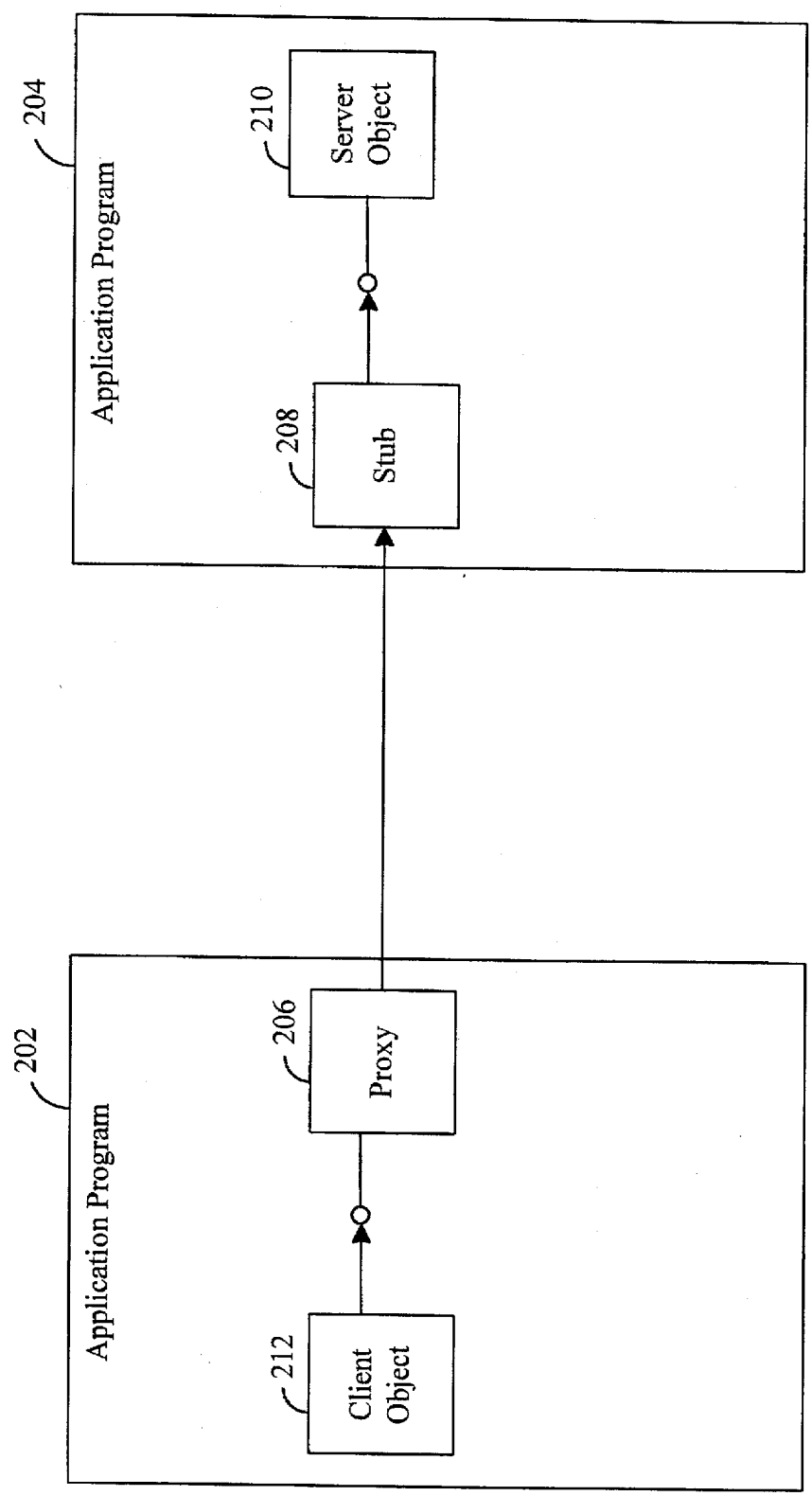
FIG. 2 depicts a block diagram of a client object accessing an interface of a server object across process boundaries.

In an application program that has many objects, each object typically has an instance of one or more interfaces that it exposes. It is not uncommon for the objects of an application program to expose the same interfaces, but with each object usually exposing a different instance of the same interfaces. Every time that an instance of an interface that is provided by one object (server object) is accessed by another object (client object) of a different process, a significant amount of system resources are utilized to provide access across process boundaries, as shown in FIG. 2. This utilization of system resources includes creating a proxy object 206 on the client side to make the access of the interface appear local to the client object 212, as well as creating a stub object 208 on the server side to communicate across process boundaries. The proxy object 206 and the stub object 208 communicate via a remote procedure call (RPC) mechanism. The proxy object 206 provides the same interface as the server object 208, but with a different implementation. When a method of the proxy object 206 is invoked by the client object 212, the proxy object sends a message to the stub object 208 indicating which method was invoked and the actual parameters for the method. The stub object 208 then invokes the indicated method of the server object 210 and passes the actual parameters. The method of the server object 210 eventually returns and the stub object 208 sends a return message along with any returned parameters to the proxy object 206. The proxy object 206, in turn, returns the return parameters to the client object 212. The overhead incurred when providing access to an interface across process boundaries is more clearly described in U.S. Pat. No. 5,511,197, entitled "A Method and System for Network Marshaling of Interface Pointers for Remote Procedure Calls," issued Apr. 23, 1996 which is hereby incorporated by reference. It is this overhead that the preferred embodiment reduces by sharing an instance of an interface, which is considerable in an application program that has many objects.

Figure 3:
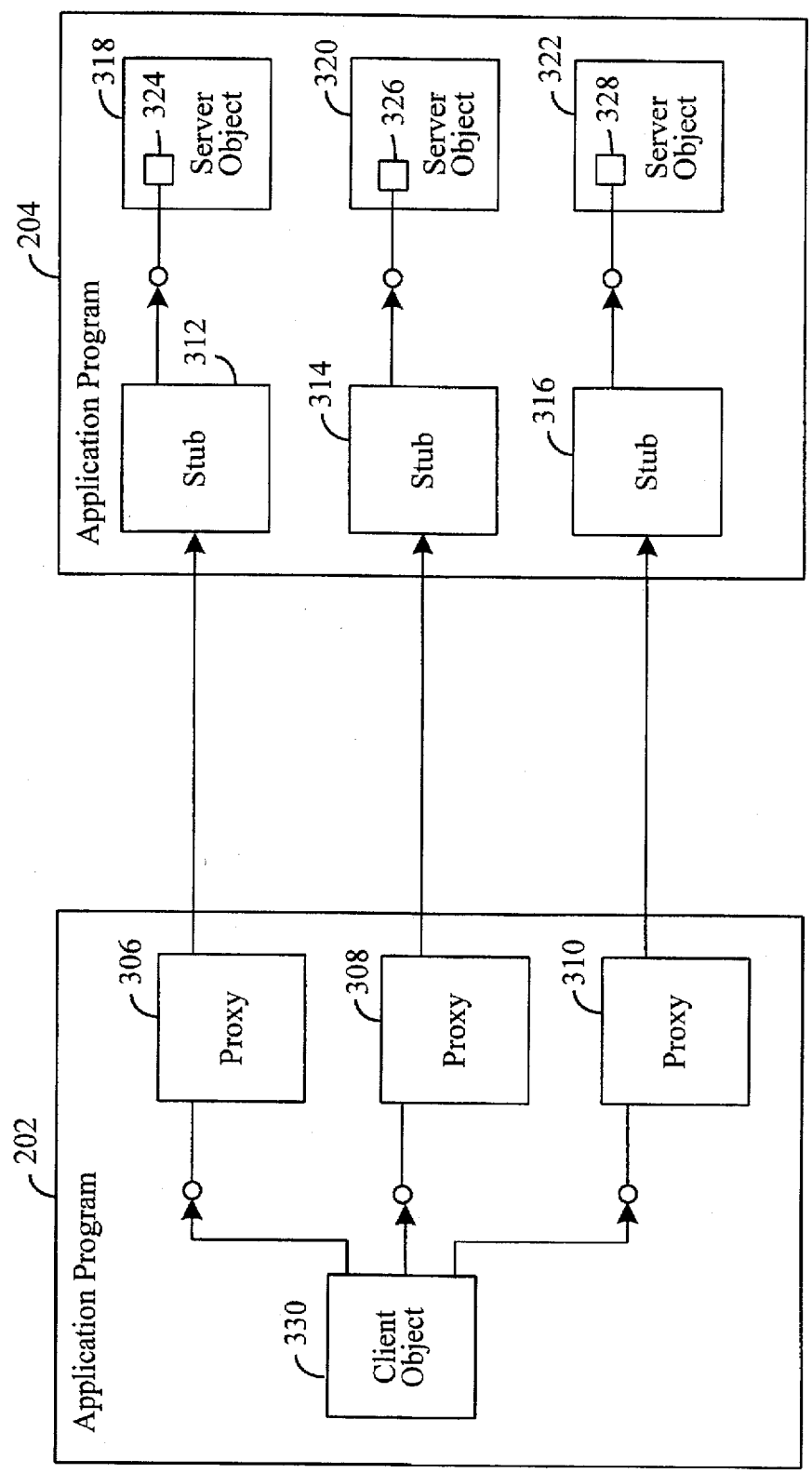
FIG. 3 depicts a conventional technique for exposing an instance of an interface.

As the number of objects increases, this overhead becomes more significant, as shown in FIG. 3. In FIG. 3, the application program 204 has three server objects 318, 320, 322, that each expose an instance of the same interface 324, 326, 328. The server objects 318, 320, 322 use a conventional technique for exposing the instances 324, 326, 328. In the figure, the client object 330 has requested references to the instances 324, 326, 328 and, therefore, proxy objects 306, 308, 310 and stub objects 312, 314, 316 have been created to provide access across process boundaries.

Figure 4:
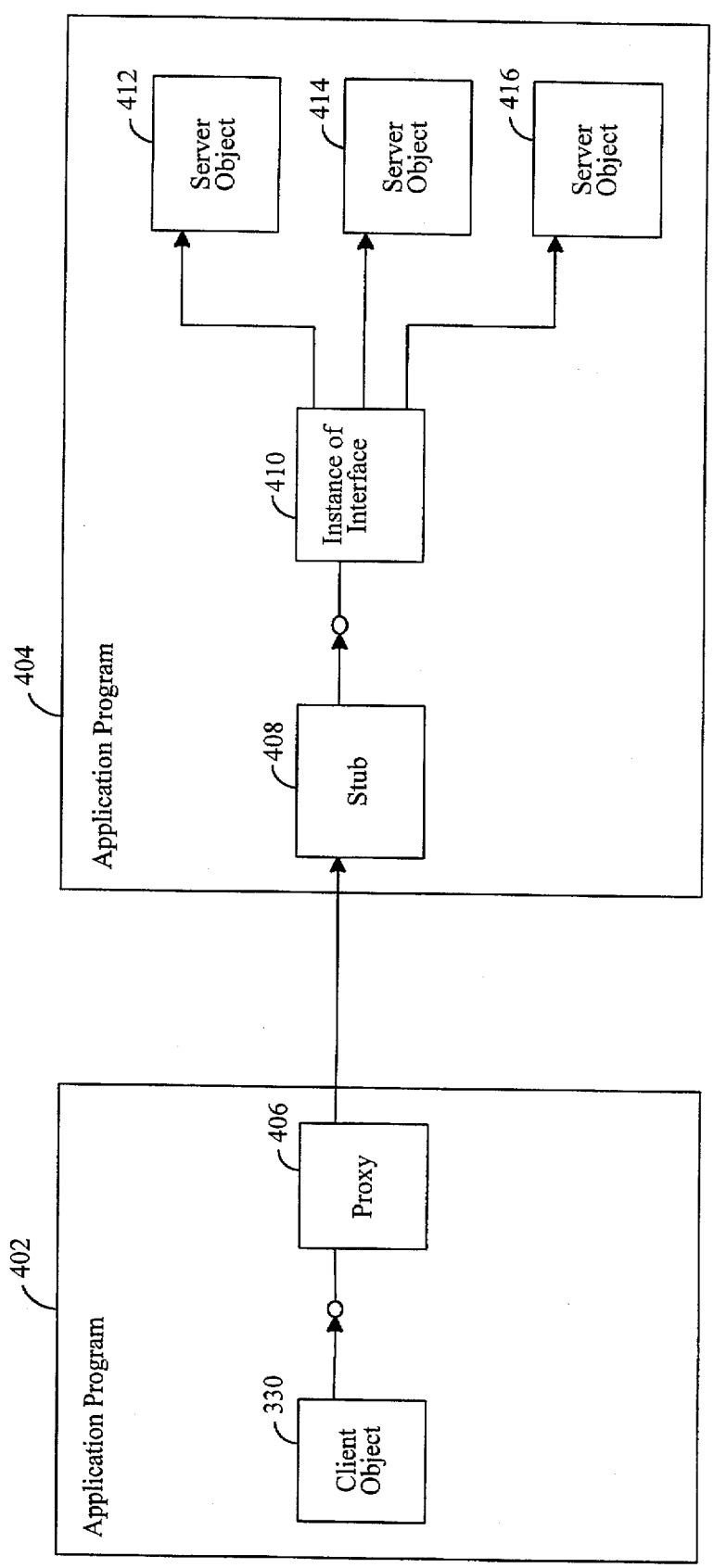
FIG. 4 depicts a technique for exposing an instance of an interface in accordance with the preferred embodiment of the present invention.

FIG. 4 depicts a technique for providing access to an interface in accordance with the preferred embodiment of the present invention. In FIG. 4, the application program 404 contains server objects 412, 414, 416 that each share an instance of an interface 410. Thus, when a request is made for a reference to the instance exposed by each of the objects 412, 414, 416, only one stub object 408 and one proxy object 406 are created, thereby saving significant amounts of system resources. The instance of the interface 410 acts as a centralized mechanism for performing operations on the server objects 412, 414, 416 and, thus, determines the object upon which it is to perform the operation.

Some interfaces that are predesigned to be instantiated on an object-by-object basis can be shared by several server objects with a new implementation. Typically, methods of such predesigned interfaces do not include a formal parameter that identifies the server objects. Rather, the identification of the server object is accomplished by the use of an implicit parameter, known as the "This pointer" (discussed below), that refers to the data members of the instance of such predesigned interface and the one-to-one correspondence between the instances of the interface and the server objects. However, when such predesigned interfaces are shared by several server objects, the This pointer is the same for each server object. Therefore, the methods of such a predesigned interface cannot determine for which server object it is invoked from either the This pointer or the actual parameters. When such a predesigned interface is shared, the implementation of the methods need some way to identify the server object for which the method is invoked. In one embodiment, the methods use the actual parameters to indirectly identify the server object. In this embodiment, the method passes certain of the actual parameters to the operating system which can identify the server object. For example, if each server object corresponds to a window on a display, and if Cartesian screen coordinates are passed to the methods, then the method can request the operating system to identify which server object is associated with passed Cartesian screen coordinates. The method can then perform its processing on behalf of the identified server object.

In order to share an instance of an interface among several server objects in accordance with the preferred embodiment, the following steps are usually performed. These steps serve as a brief overview of the preferred embodiment and are described relative to an interface whose methods transfer data. However, one skilled in the art will appreciate that the preferred embodiment can be used with other interfaces whose methods perform different processing. First, as part of initialization, an instance of the interface is created and is registered with the system (e.g., operating system or object management system) for each server object that can receive data so that the server objects share the same instance. Then, at some point, a data transfer request is received by the system, which may originate from a user. The data transfer request typically identifies the server object (the destination object) that is to receive the data. After receiving the data transfer request, the system accesses the shared instance of the interface that was previously registered for the destination object and then transfers the data utilizing the methods of the instance of the interface. Since the interface is shared among multiple objects and is usually predesigned to be instantiated on an object-by-object basis, the methods determine the destination server object as part of their processing.

Such a predesigned interface that can be shared is one developed to support the drag and drop operation. The drag and drop operation is used to transfer data from a source, such as a text file, to a destination, such as a word processing document when windows for the source and destination are displayed on a computer display. When performing a drag and drop operation, a user selects data contained within the source, by typically using a mouse. The data is selected by manipulating the mouse so that the mouse cursor, which reflects the movement of the mouse on the computer display, is pointing at the desired data. Then the mouse button is depressed by the user and the user manipulates the mouse until all of the desired data is selected, which is usually indicated by the data being displayed in reverse video, and releases the mouse button. The user then manipulates the mouse so that the mouse cursor refers to the selected data and again depresses the mouse button. After depressing the mouse button, the user moves the mouse cursor to the destination while keeping the mouse button depressed. After the mouse cursor is over the destination, the user releases the mouse button and the selected data appears to be inserted into the destination. Typically, both the source and the destination are objects that store data, such as a document or a window. Since computer systems usually have only one mouse, one drag and drop operation can occur at a time. Therefore, it is both possible and practical within the context of a drag and drop operation, to have only one instance of the interface that performs the drag and drop operation shared among multiple objects. Otherwise, if more than one drag and drop operation could occur at a time, significant complexity would have to be added to the methods and data members to make the code of the methods reentrant. This complexity would probably make sharing an instance of an interface impractical when the interface performs an operation that can occur more than once at a given time. That is, the benefit of saving system resources would be reduced and the implementation of the interface would become more difficult. The preferred embodiment of the present invention takes advantage of the observation that only one drag and drop operation occurs at a time by having multiple objects share one instance of an implementation of the interface that supports the drag and drop operation, which is known as the IDropTarget interface in the OLE object-oriented system. Thus, with reference again to FIG. 4, in the preferred embodiment, the instance of the interface 410 is an instance of the IDropTarget interface and the objects 412, 414, 416 that share the instance correspond to the windows that can act as the destination of a drag and drop operation.

In conjunction with the IDropTarget interface, the preferred embodiment utilizes the IDataObject OLE interface for actually transferring data. The IDataObject interface has methods for determining the format of the data to be transferred, for determining the medium over which the data is to be transferred, as well as for transferring the data. The IDataObject interface is more clearly described in U.S. patent application Ser. No. 08/199,853, entitled "Uniform Data Transfer," which is hereby incorporated by reference.

Lower Level Detail

Figure 5:
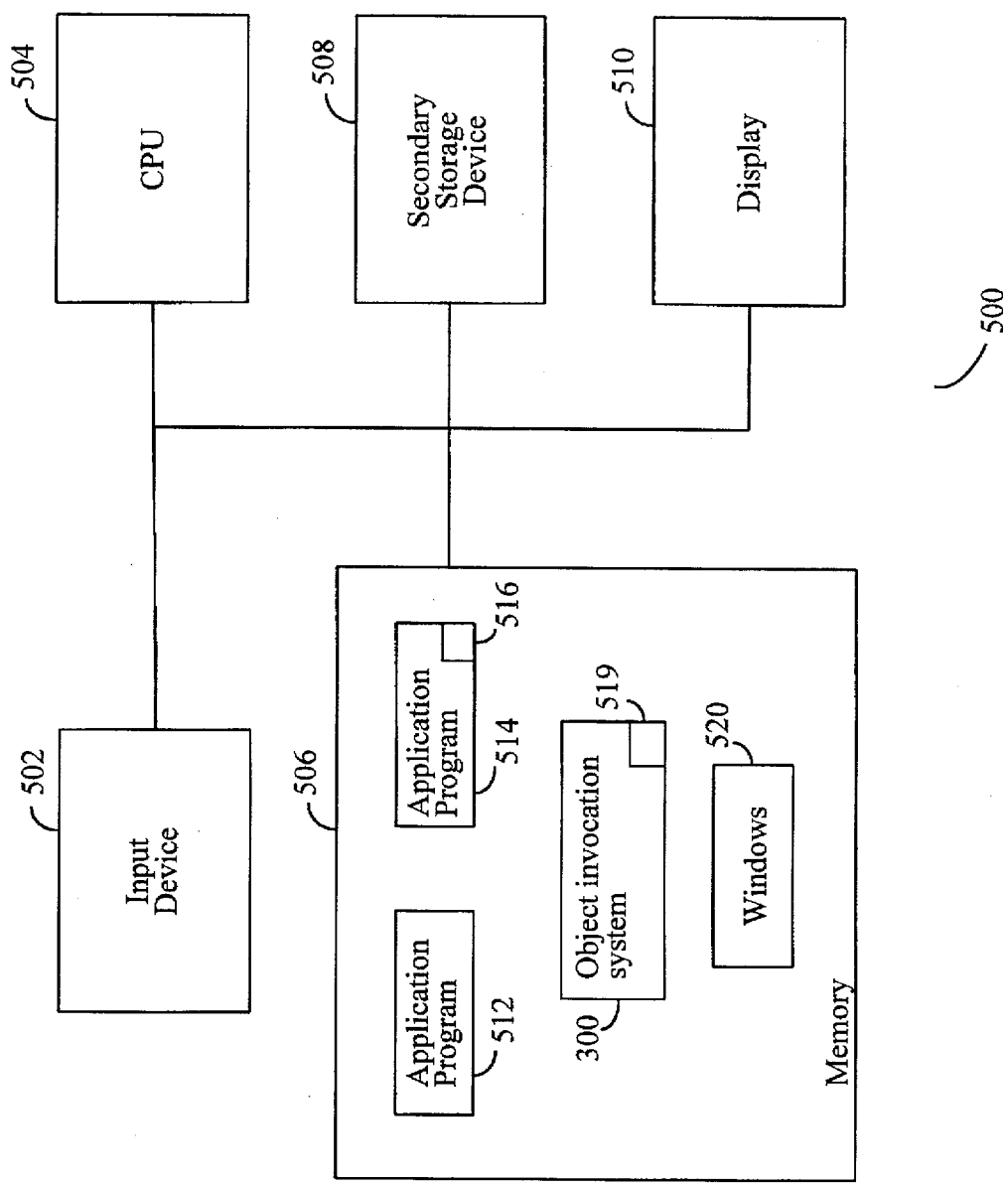
FIG. 5 is a block diagram of a computer system suitable for practicing the preferred embodiment of the present invention.

FIG. 5 depicts a computer system 500 suitable for practicing the preferred embodiment of the present invention. The computer system 500 contains an input device 502, such as a mouse, a central processing unit (CPU) 504, a secondary storage device 508, a display 510 and a memory 506. Although the computer system 500 has been described as having various components, one skilled in the art will appreciate that additional or different components can be used. The memory 506 contains the "MICROSOFT WINDOWS" Operating System 520, available from Microsoft Corporation, an application program 512 that acts as the source of a drag and drop operation, an application program 514 that has multiple windows that each can act as the destination of a drag and drop operation, and an object invocation system 300, such as OLE. The application program 514 typically displays many windows. An example of an application program 514 that has many windows is the Microsoft Project project planning software product, available from Microsoft Corporation, which displays multiple windows with more than one window being associated with a particular project. The application program 514, as described below, utilizes the interface sharing of the preferred embodiment to save system resources.

Each window within the application program 514 has a window procedure 516 that handles events directed to the window. The events that are handled by the window procedure 516 include events from the input device 502, such as a MOUSE_DOWN event or a MOUSE_MOVE event, as well as events from the "WINDOWS" operating system 520 that include timer events, etc. The window procedure acts as the main routine for a window and is typically implemented as a case statement with one switch for every message anticipated.

Figure 6:
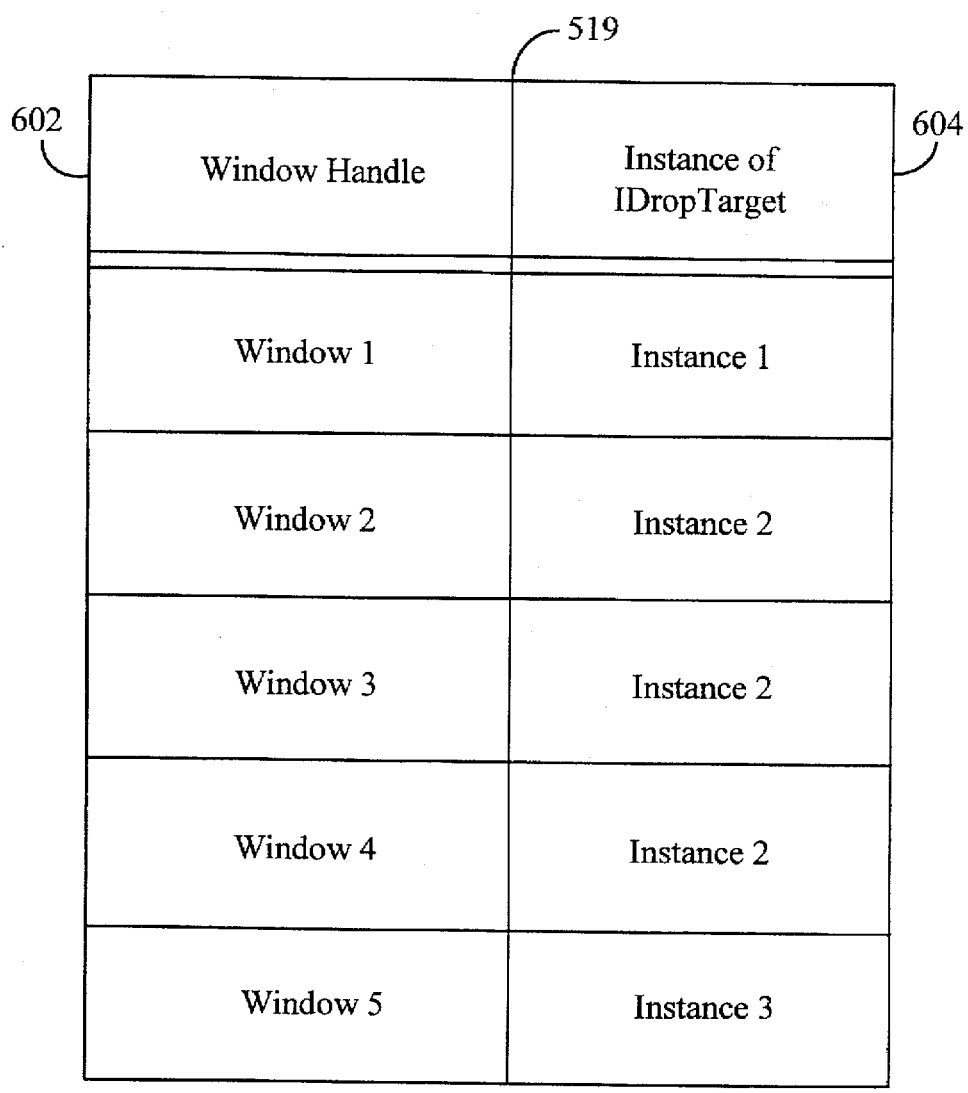
FIG. 6 depicts a more detailed diagram of the registry of FIG. 5.

The object invocation system 300 is an object-oriented environment that contains a registry 519. An example of the registry 519 is depicted in FIG. 6. The registry 519 has entries for all windows in the computer system that may be used as a destination (or target) of a drag and drop operation. Each entry contains a reference to a window, known as a window handle 602, and a reference to an instance of the IDropTarget interface 604. As depicted, window 2, window 3 and window 4 share instance 2 in accordance with the preferred embodiment. (In prior systems, each window would have a unique reference to its own instance of the interface.) The registry 519 is used by the object invocation system 300 during a drag and drop operation to determine which instance of the IDropTarget interface is associated with a destination window. Therefore, during a drag and drop operation, when a user moves the mouse cursor over a destination window, "WINDOWS" 520 notifies the object invocation system 300 of the window over which the mouse cursor is located and the object invocation system then utilizes the registry 519 to determine the instance of the IDropTarget interface is associated with a destination window. Then, as described below, the drag and drop operation is performed utilizing the methods of the instance of the IDropTarget interface.

As previously described, the IDropTarget interface provided by the destination of a drag and drop operation is utilized to perform the drag and drop operation. Additionally, the object invocation system provides various functions that are also used in performing the drag and drop operation. These functions together with the IDropTarget interface are depicted below in Code Table 1 using C++ pseudocode.

CODE TABLE 1

```
HRESULT    RegisterDragDrop(hwnd, pDropTarget);
HRESULT    RevokeDragDrop(hwnd);
HRESULT    DoDragDrop(pDataObj, pDropSource, dwOKEffects,
           pdwEffect);
interface IDropTarget:Iunknown {
    virtual HRESULT DragEnter(pDataObj, grfKeyState, pt,
    pdwEffect) = 0;
    virtual HRESULT DragOver(grfKeyState, pt, pdwEffect) = 0;
    virtual HRESULT DragLeave() = 0;
    virtual HRESULT Drop(pDataObj, grfKeyState, pt,
    pdwEffect) = 0;
};
```

The RegisterDragDrop function is used by an application program to register one or more of its windows to be a destination of a drag and drop operation. The RegisterDragDrop function creates an entry into the registry, where the entry contains a handle to the window, "hwnd," as well as a reference to the IDropTarget interface for that window, "pDropTarget." After the RegisterDragDrop function is invoked, when the mouse cursor passes over an unobscured portion of the window referred to in hwnd, the methods of the instance of the IDropTarget interface referred to by pDropTarget are invoked. The RegisterDragDrop function returns a return code, HRESULT, indicating the success or failure of the function. The RevokeDragDrop function removes the entry from the registry for the window referred to in "hwnd" so that this window can no longer be used as a destination for a drag and drop operation.

The DoDragDrop function is invoked by the source of a drag and drop operation in order to carry out the operation. Upon being notified of the invocation of a drag and drop operation, typically through the user depressing the mouse button on some already selected data (or object), the source invokes the DoDragDrop function and is blocked until the successful completion of the drag and drop operation or until the cancellation of the operation. The source passes into this function a parameter containing a reference to the data to be transferred during the drag and drop operation, "pDataObj," which is a reference to an IDataObject interface. By utilizing the methods on this interface, the data can be transferred and available formats for the data can be queried as is more clearly described in U.S. patent application Ser. No. 08/199, 853, entitled "Uniform Data Transfer," which has previously been incorporated by reference. A second parameter to this function is the pDropSource parameter which is an interface that has methods that allow the object invocation system to communicate with the source during the drag and drop operation. The dwOKEffects parameter indicates the effects that the source will allow on the data that is the subject of the drag and drop operation. For example, this parameter indicates whether the source will allow the data to be moved or copied. The pdwEffect parameter is an output parameter that indicates what effect occurred to the source data, such as whether the source data was moved or copied during the drag and drop operation. In addition, the DoDragDrop function returns a return code indicating the success or failure of the function.

As previously stated, the IDropTarget interface provides various methods that are utilized during a drag and drop operation. An instance of this interface is registered with the object invocation system and during the drag and drop operation, the methods of this instance of the interface are invoked to perform the drag and drop operation. The DragEnter method of the IDropTarget interface is invoked as the mouse cursor first enters a window. The DragEnter method has a number of parameters: a reference to the data being transferred, "pDataObj," which is a reference to an IDataObject interface; an indication of the state of the modifier keys on the keyboard, "grfKeyState"; the coordinates of the mouse cursor, "pt"; and the permissible effects on the source data allowed by the source, "pdwEffect." The grfKeyState parameter identifies whether certain keys on the keyboard are depressed, which would indicate a modification to the typical drag and drop functionality. For example, in some application programs, if the control button is held down while the drag and drop operation is performed, the data is copied as opposed to being moved. The coordinates of the mouse cursor contained in the "pt" parameter are given in terms of Cartesian coordinates relative to the upper left-hand portion of the screen.

The DragOver method of the IDropTarget interface is invoked as the mouse cursor, after originally entering the destination window, continues to remain and move within the window. The parameters of this function are similar to those as described relative to the DragEnter function with the exception that a reference to the IDataObject interface is not a parameter. The DragLeave method is invoked when the mouse cursor leaves a window during a drag and drop operation. The Drop method is invoked when the user completes the drag and drop operation by releasing the mouse button. The parameters to this method are similar to those described relative to the DragEnter method.

Typical Prior Uses of IDropTarget

Figure 7A:
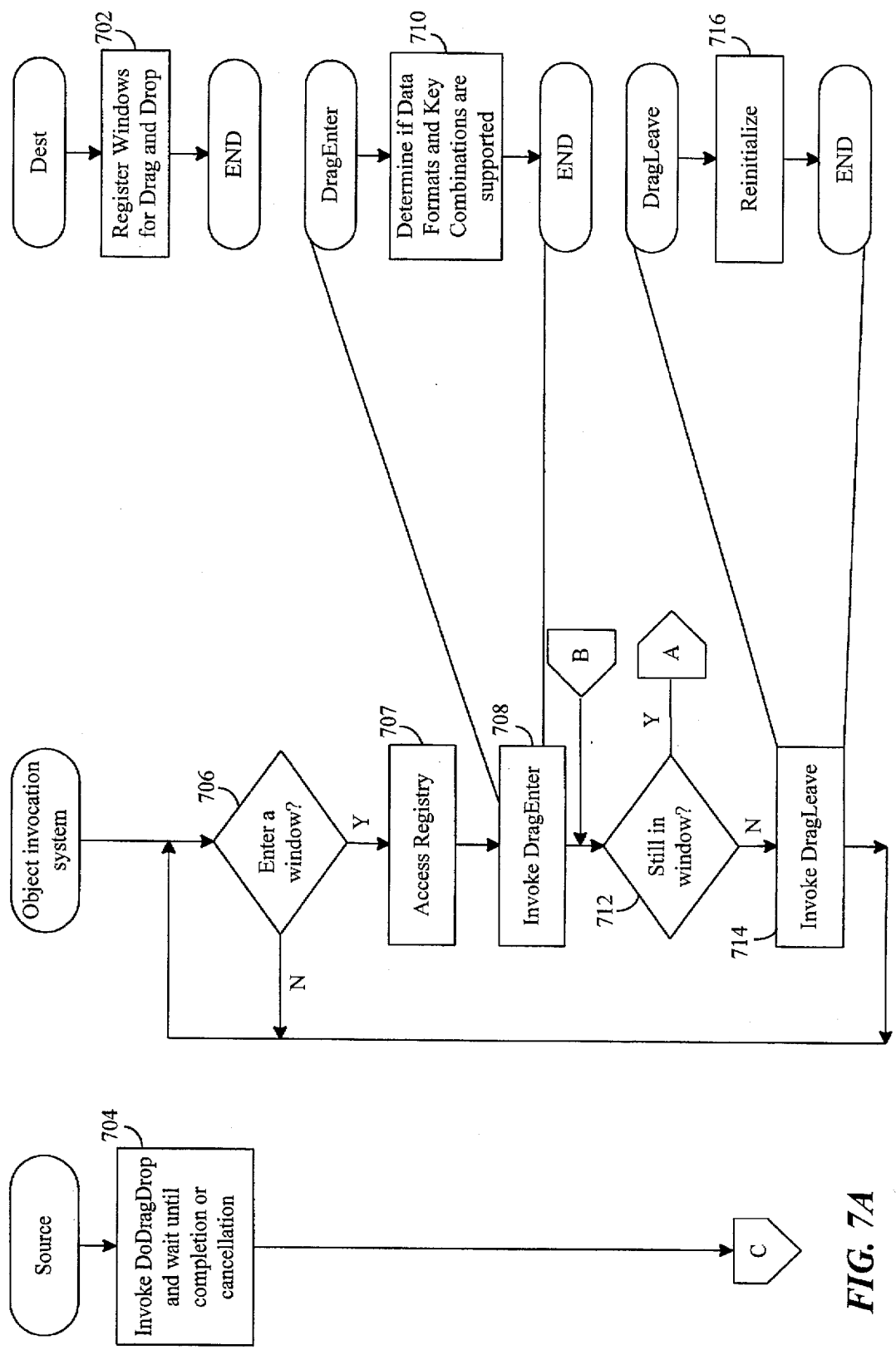
FIGS. 7A and 7B depict a flowchart of the steps performed during a drag and drop operation when utilizing the IDropTarget interface.
Figure 7B:
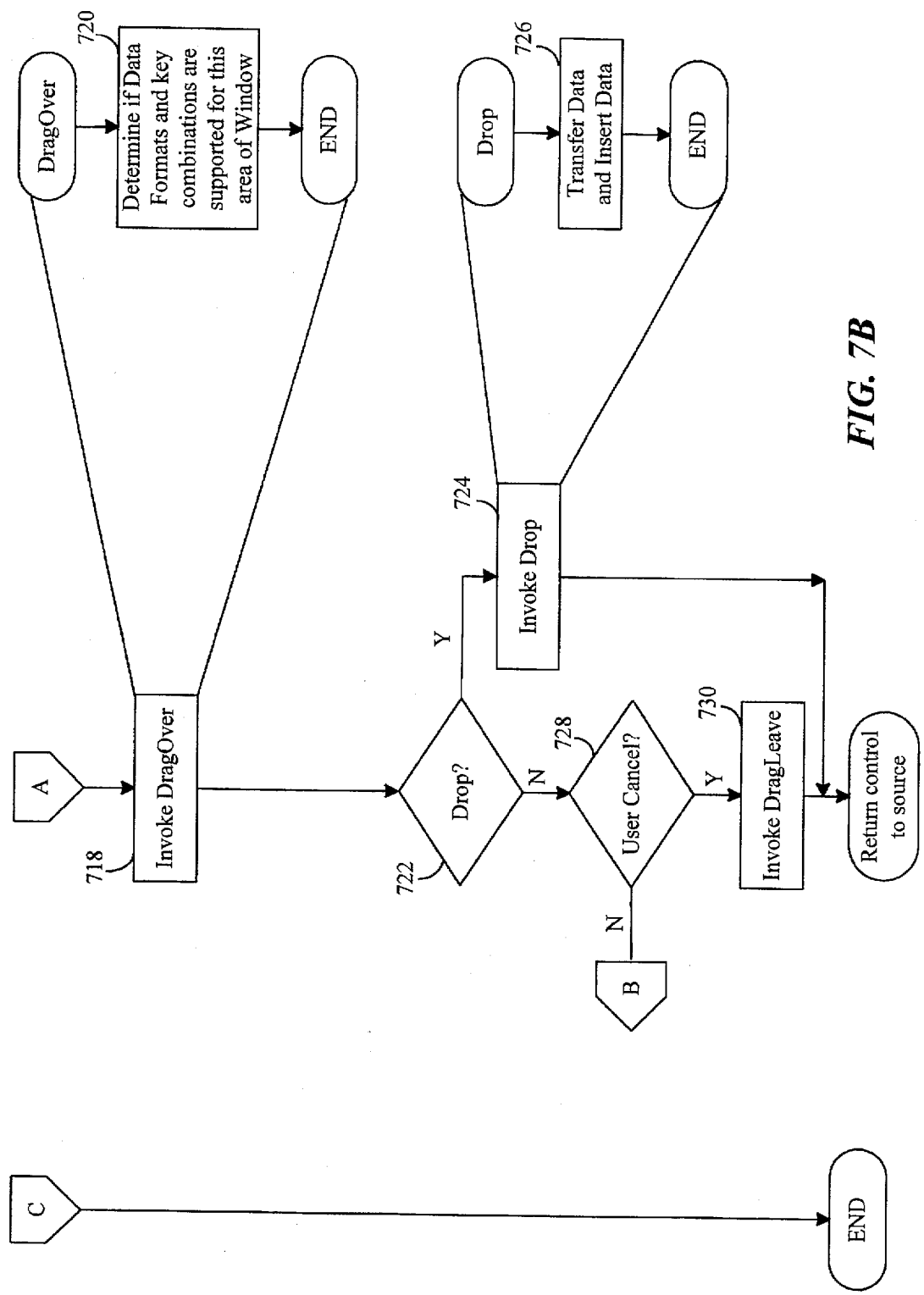

FIGS. 7A and 7B depict the typical use of the IDropTarget interface during a drag and drop operation. These figures describe the processing performed by a source application program, the object invocation system, a destination application program, and the methods of the IDropTarget interface, which are registered with the object invocation system, but are actually part of the destination application program. It should be appreciated that the below description of the implementation of the methods is merely illustrative and one skilled in the art will appreciate that the implementation of the methods depends on the functionality of the destination application program. In a drag and drop operation, the first step performed is that the destination application program registers its windows to be targets of a drag and drop operation (step 702). In this step, the destination application program creates an instance of the IDropTarget interface for each of its windows and invokes the RegisterDragDrop function to register one instance for each of the windows. Sometime later, the user performs a drag and drop operation from a window of the source application program and the source application program invokes the DoDragDrop function and waits until the completion or cancellation of the drag and drop operation (step 704). After the source invokes the DoDragDrop function, the object invocation system takes control and determines when the mouse cursor enters a window (step 706). In this step, the object invocation system receives events from "WINDOWS" indicating the position of the mouse and continually waits until the mouse cursor enters a window. When the mouse cursor enters a window, the object invocation system accesses the registry with the window handle of the window to retrieve the instance of the IDropTarget interface that is registered with the object invocation system for that window (step 707). After retrieving the instance of the interface, the object invocation system invokes the DragEnter method of the interface (step 708).

Upon invocation, the DragEnter method determines if the data formats and key combinations are supported (step 710). This processing is performed by invoking the methods of the IDataObject interface that is passed into the DragEnter method as a parameter. This processing is merely exemplary of what can be performed in an implementation of the DragEnter method. However, other implementations may perform other types of processing. For example, in addition to determining whether the data formats and the key combinations are supported, an implementation can determine if a particular medium for transferring the data is supported. Further, the implementation may perform other processing related to the drag and drop operation as supported by the methods of the IDataObject interface. After invoking the DragEnter method, the object invocation system determines if the mouse cursor is still within the window (step 712). If the mouse cursor is no longer within the window, the object invocation system invokes the DragLeave method (step 714). An implementation of the DragLeave method may prepare the destination for another drag and drop operation by reinitializing variables or structures (step 716). After invoking the DragLeave method, the object invocation system continues to step 706.

However, if the object invocation system determines that the mouse cursor is still within the window, the object invocation system invokes the DragOver method (step 718 in FIG. 7B). The DragOver method, when invoked, determines if the data formats and key combinations are supported for the area of the window currently referred to by the mouse cursor (step 720). After invoking the DragOver method, the object invocation system determines if a drop has been performed (step 722). In making this determination, the object invocation system determines whether it has received a notification of the release of the mouse button. If a drop has occurred, the object invocation system invokes the Drop method of the IDropTarget interface (step 724). The implementation of the Drop method transfers the data and inserts the data into the destination window (step 726). The transferring of the data is accomplished by invoking various methods of the IDataObject interface. If a drop has not occurred, the object invocation system determines if the user has cancelled the operation (step 728). The object invocation system determines whether the user has cancelled the operation by being notified of the depression of a specific key, such as the escape key. If the user has not cancelled the operation, processing continues to step 712. However, if the user has cancelled the operation, the object invocation system invokes the DragLeave method (step 730). The implementation of the DragLeave method has previously been described relative to step 716 of FIG. 7A. After either invoking the Drop method or invoking the DragLeave method, the object invocation system returns control to the source where the source then receives an indication of the successful or unsuccessful completion of the DoDragDrop function as invoked in step 704, and the source is no longer blocked.

Preferred Use of IDropTarget

The preferred embodiment of the present invention, as previously described, shares an instance of the IDropTarget interface between multiple objects. In order to share an instance of the IDropTarget interface, the processing of the destination in registering its windows and the implementation of the methods of the instance of the IDropTarget interface differs over the processing described relative to FIGS. 7A and 7B. Basically, the processing usually performed by the methods of the IDropTarget interface is, in the preferred embodiment, performed by the window procedure. In the preferred embodiment, the methods of the IDropTarget interface determine upon which window the drag and drop operation is to be performed and then send a message to the window procedure for that window, so that the window procedure can perform the appropriate processing. Thus, the window procedure of a window that shares an instance of an IDropTarget interface plays an active role in the drag and drop operation.

Figure 8A:
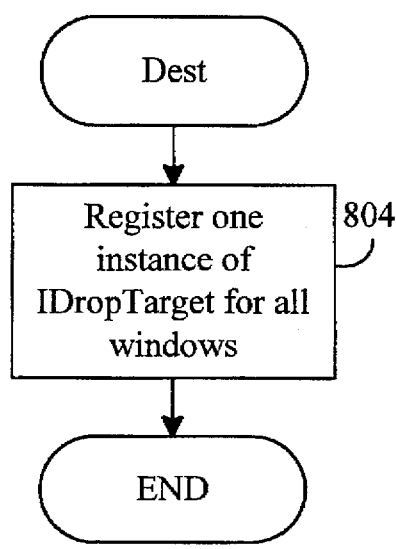
FIGS. 8A, 8B, 8C, 8D and 8E depict flowcharts of the steps performed by the destination of a drag and drop operation when utilizing the IDropTarget interface in accordance with the preferred embodiment of the present invention.

With respect to the registration of windows, a destination that shares an instance of the IDropTarget interface between multiple objects creates one instance of the IDropTarget interface and registers the one instance for all of the windows that the destination wishes to be a target for a drag and drop operation, as shown in FIG. 8A. The destination creates the instance of the IDropTarget interface by defining the interface and the implementation of the interface in the code of the destination application program and invoking the well-known C++ "new" operator. The "new" operator dynamically allocates memory for the interface. The destination registers the instance for each window by invoking the RegisterDragDrop function. By registering this instance of the IDropTarget interface for all windows, regardless of which window becomes the target of a drag and drop operation, the one instance of the IDropTarget interface is invoked.

Figure 8B:
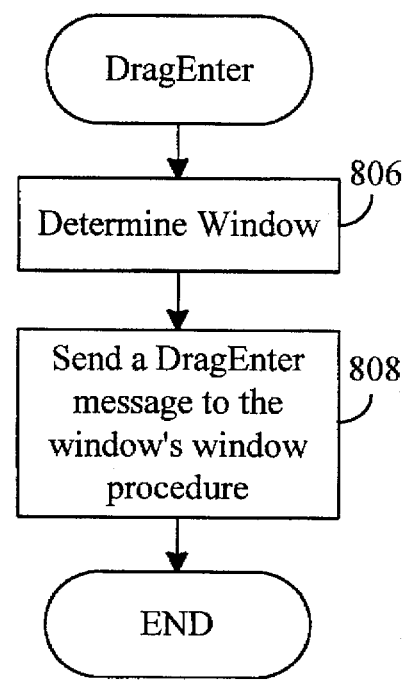
Figure 8C:
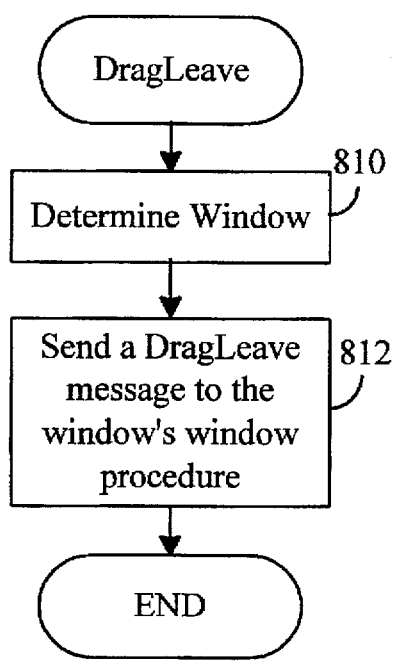
Figure 8D:
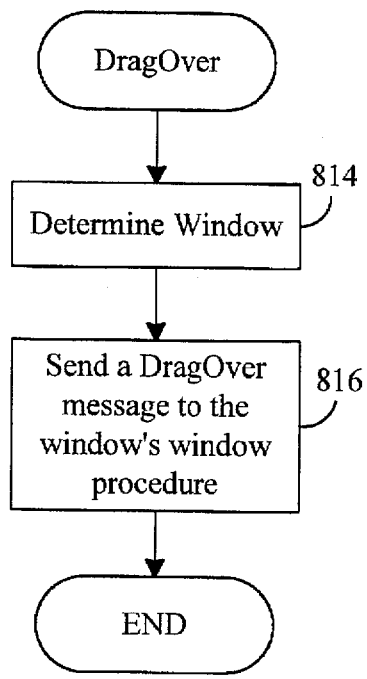
Figure 8E:
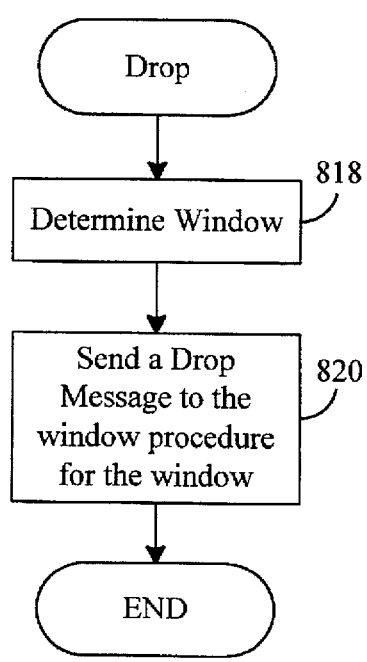

With respect to the methods of the IDropTarget interface, these methods perform specific processing that enables the sharing of the instance of the interface. The implementation of these methods first determines the window that is the target of the drag and drop operation and then sends a specific message to the window procedure of the target window. Since the instance of the IDropTarget interface is shared by many windows, the implementation does not know which window is the target window and therefore must determine the target window so that the appropriate window procedure can be invoked. The specific message sent to the window procedure indicates the method through which the message was sent. For example, a DragEnter message is sent when the message was sent through the DragEnter method. The window procedure, in turn, will then perform the processing normally associated with the method. For example, FIG. 8B depicts an implementation of the DragEnter method in accordance with the preferred embodiment of the present invention. Upon invocation of the DragEnter method, the DragEnter method determines the target window (step 806) and sends a DragEnter message to the window procedure for the target window (step 808). The DragEnter method determines the target window by invoking the well-known "WINDOWS" function "WindowFromPoint" and passes into this function the mouse coordinates that were received as a parameter. This function then returns the window handle of the target window. The DragEnter method sends a DragEnter message to the window procedure by invoking the well-known "WINDOWS" function "SendMessage" and passing the following parameters: the handle to the window, an indication of the DragEnter message, and the "This pointer." The DragEnter message is a predefined literal. The "This pointer" is a reference to the IDropTarget interface so that during the processing of the window procedure, the window procedure will have access to the data members of the IDropTarget interface, which includes the IDataObject interface. Passing the This pointer centralizes the state information and the processing of the drag and drop operation. The DragLeave method, the DragOver method, and the Drop method perform similar processing to the DragEnter method in that they first determine the target window and then send a message to the target window, as depicted in FIGS. 8C, 8D and 8E. However, the message sent to the window procedure varies depending on the method. That is, a DragOver message is sent by the DragOver method, a DragLeave message is sent by the DragLeave method and a Drop message is sent by the Drop method. These messages are predefined literals.

Figure 9:
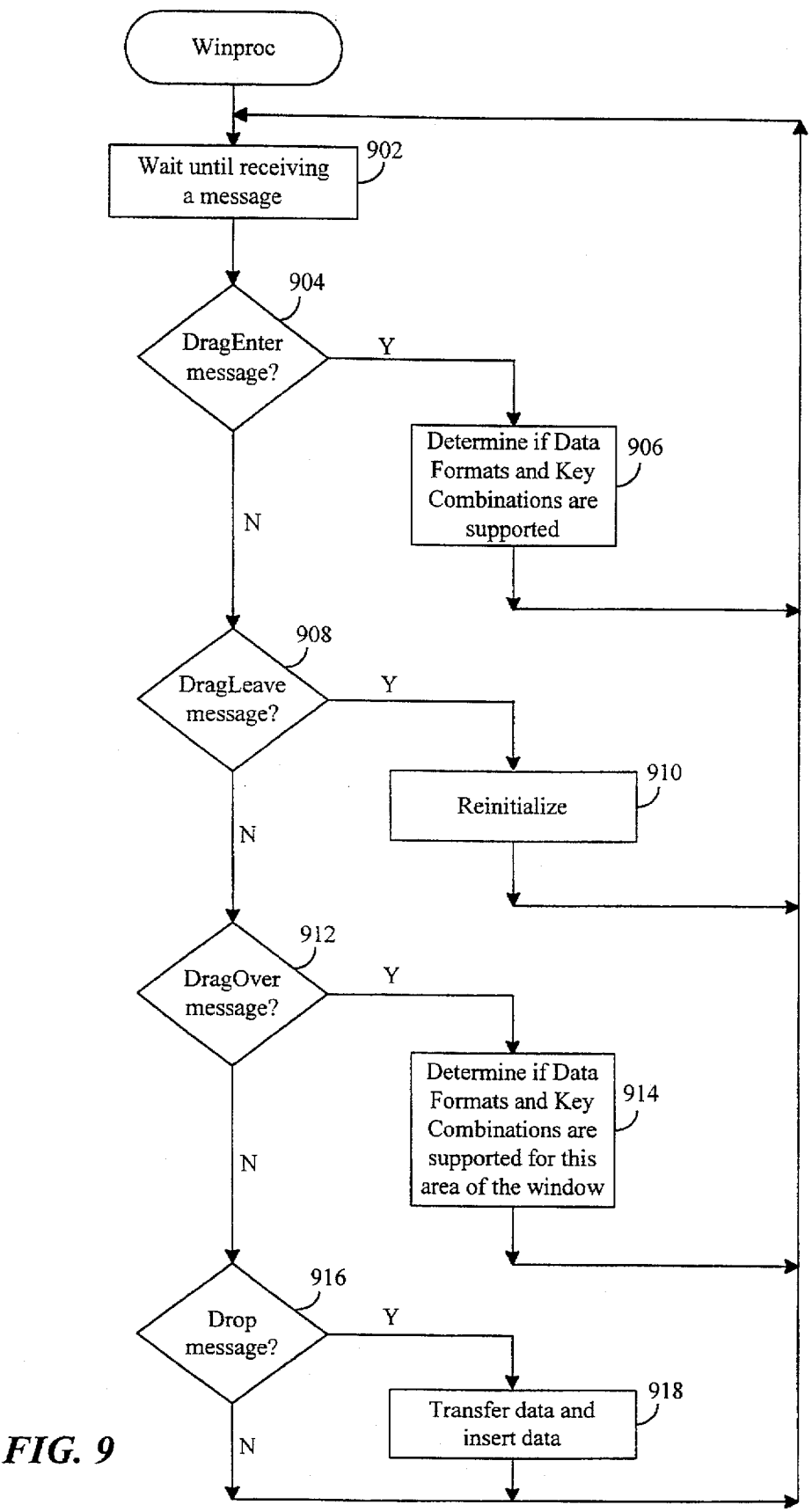
FIG. 9 depicts a flowchart of the steps performed by a window procedure of the preferred embodiment of the present invention.

FIG. 9 depicts a flow chart of the steps performed by the window procedure of a window that shares an instance of the IDropTarget interface in accordance with the preferred embodiment of the present invention. As previously stated, a window procedure acts as the main routine for a window and is typically implemented as a case statement with one switch for every message that is anticipated. Although the window procedure is described below relative to specific processing, it should be appreciated that the window procedure can perform different processing depending on the functionality of the window. The window procedure is event driven and thus initially waits until receiving a message (step 902). This message may be received from the input device or "WINDOWS." After receiving a message, the window procedure determines whether the message is a DragEnter message (step 904). If the message received is the DragEnter message, the window procedure determines if the data formats and the key combinations are supported (step 906). However, other processing may be performed that utilizes the methods of the IDataObject interface. If the data formats or key combinations are not supported, the window procedure returns a value indicating that the drag and drop operation is not accepted, which is returned to the DragEnter method and is then returned to OLE. After receiving this value, OLE cancels the drag and drop operation. After determining if the data formats and key combinations are supported, processing continues to step 902.

If the message is determined not to be the DragEnter message, the window procedure determines if the message is the DragLeave message (step 908). If the message received is the DragLeave message, the window procedure reinitializes various variables or structures in order to prepare for another drag and drop operation (step 910). After reinitialization, processing continues to step 902. If the message received was not the DragLeave message, the window procedure determines if the message is the DragOver message (step 912). If the message received is the DragOver message, the window procedure determines if the data formats and key combinations are supported for the area of the window where the mouse cursor is currently located (step 914) and processing continues to step 902. If the message received is not the DragOver message, the window procedure determines if the message received is the Drop message (step 916). If the message received is the Drop message, the window procedure transfers the data and inserts the data into the window (step 918) and continues to step 902. The transferring of the data is performed by invoking the methods of the IDataObject interface. If the message received is not the Drop message, processing continues to step 902.

While the present invention has been described with reference to a preferred embodiment thereof, those skilled in the art will know of various changes in form that may be made without departing from the spirit and scope of the claimed invention as defined in the appended claims.

We claim:

1. In a computer system having a source screen object having data, a plurality of destination screen objects for receiving the data from the source screen object, and an interface with function members for transferring the data, a method for sharing an instance of the interface between the destination screen objects, comprising the steps of:

under the control of the computer system, creating the instance of the interface;

for each of the destination screen objects, registering the instance of the interface with the computer system;

receiving a request to transfer the data from the source screen object to a selected one of the destination screen objects in response to user input;

retrieving the instance of the interface registered for the selected destination screen object; and transferring the data from the source screen object to the selected destination screen object utilizing the function members of the retrieved instance of the interface, wherein each of the function members determines which of the destination screen objects is the selected destination screen object.

2. In a computer system having a source object having data, a plurality of destination objects for receiving the data from the source object, and an interface with function members for transferring the data, a method for sharing an instance of the interface, comprising steps of:

under the control of the computer system, creating the instance of the interface;

exposing the instance of the interface by each of the destination objects;

receiving a request by the computer system to transfer the data from the source object to an identified one of the destination objects;

accessing the instance of the interface by the computer system; and invoking the function members of the instance of the interface by the computer system to transfer the data from the source object to the identified destination object.

3. The method of claim 2 wherein the step of receiving a request includes the step of receiving a request to perform a drag and drop operation and wherein the step of invoking the function members includes the step of performing the drag and drop operation.

4. The method of claim 2 wherein the source object and the destination objects are windows for displaying data.

5. In a computer system having a first window, a second window and an interface with function members for performing a drag and drop operation, a method comprising the computer-implemented steps of:

creating an instance of the interface to be used by the first window and the second window;

receiving a first request to perform a first drag and drop operation by the first window;

performing the first drag and drop operation on the first window utilizing the function members of the instance of the interface;

receiving a second request to perform a second drag and drop operation by the second window; and performing the second drag and drop operation on the second window utilizing the function members of the instance of the interface.

6. The method of claim 5 wherein the computer system has windows other than the first window and the second window, wherein the step of performing the first drag and drop operation includes determining on which of the windows to perform the drag and drop operation and wherein the step of performing the second drag and drop operation includes determining on which of the windows to perform the drag and drop operation.

7. A data processing system comprising:

a registry having entries that store references to windows and references to instances of an interface, the interface having function members for transferring data;

an application program for displaying a plurality of windows and having a first component for creating an instance of the interface and a second component for creating an entry in the registry for each of the plurality of windows of the application program, each entry containing a reference to one of the plurality of windows and a reference to the instance of the interface; and a receive component for receiving a request to transfer data from a source to an identified one of the plurality of windows of the application program, for accessing the registry to determine the instance of the interface and for transferring the data from the source to the identified window utilizing the function members of the instance of the interface.

8. The data processing system of claim 7 wherein the function members of the instance of the interface have a component for determining the identified window.

9. A data processing system comprising:

an instance of an interface having function members for performing an operation on an object;

application program having a plurality of objects, further comprising:

a first object of the plurality of objects that exposes the instance of the interface; and a second object of the plurality of objects that exposes the instance of the interface; and a consumer component for accessing the instance of the interface, for invoking the function members of the instance of the interface to perform the operation on the first object and for invoking the function members of the instance of the interface to perform the operation on the second object.

10. The data processing system of claim 9 wherein the objects are windows for displaying data.

11. The data processing system of claim 9 wherein the operation is the drag and drop operation.

12. The data processing system of claim 9 wherein the plurality of objects are organized into a plurality of classes and wherein the first object and the second object belong to one class of the plurality of classes.

13. The data processing system of claim 9 wherein the function members of the instance of the interface have a component for determining whether the operation is to be performed on the first object or the second object.

14. In a computer system having a source window with data, a plurality of destination windows for receiving the data from the source window, an interface with function members for transferring the data, and an operating system for managing the destination windows, a method for sharing an instance of the interface between the destination windows, comprising the steps of:

under the control of the computer system, creating the instance of the interface;

for each of the destination windows, registering the instance of the interface with the computer system;

receiving a request to transfer the data from the source window to a selected one of the destination windows in response to user input, the user input indicating a location of the selected destination window but not identifying the selected destination window;

retrieving the instance of the interface registered for the selected destination window; and transferring the data from the source window to the selected destination window utilizing the function members of the retrieved instance of the interface, wherein each of the function members receives the location of the selected destination window and determines which of the destination windows is the selected destination window by querying the operating system with the location of the selected destination window.

15. A computer-readable medium containing instructions for controlling a computer system to perform a method, the computer system having a source object with data, a plurality of destination objects for receiving the data from the source object, and an interface with function members for transferring the data, the method for sharing an instance of the interface, comprising steps of:

under the control of the computer system, creating the instance of the interface;

exposing the instance of the interface by each of the destination objects;

receiving a request by the computer system to transfer the data from the source object to an identified one of the destination objects;

accessing the instance of the interface by the computer system; and invoking the function members of the instance of the interface by the computer system to transfer the data from the source object to the identified destination object.

16. The computer-readable medium of claim 15 wherein the step of receiving a request includes the step of receiving a request to perform a drag and drop operation and wherein the step of invoking the function members includes the step of performing the drag and drop operation.

17. The computer-readable medium of claim 15 wherein the source object and the destination objects are windows for displaying data.

18. A computer-readable medium containing instructions for controlling a computer system to perform a method, the computer system having a first window, a second window, and an interface with function members for performing a drag and drop operation, the method comprising the steps of:

creating an instance of the interface to be used by the first window and the second window;

receiving a first request to perform a first drag and drop operation by the first window;

performing the first drag and drop operation on the first window utilizing the function members of the instance of the interface;

receiving a second request to perform a second drag and drop operation by the second window; and performing the second drag and drop operation on the second window utilizing the function members of the instance of the interface.

19. The computer-readable medium of claim 18 wherein the computer system has windows other than the first window and the second window, wherein the step of performing the first drag and drop operation includes determining on which of the windows to perform the drag and drop operation and wherein the step of performing the second drag and drop operation includes determining on which of the windows to perform the drag and drop operation.

20. A computer-readable medium containing instructions for controlling a computer system to perform a method for providing access to objects of a program, wherein the objects support an interface, the method performed by the program comprising the steps of:

creating an instance of the interface; and exposing the instance of the interface by each of the objects, wherein the instance is utilized by a caller to access a selected one of the objects.

21. The computer-readable medium of claim 20 wherein the interface contains function members that perform functionality and that determine which among the objects is the selected object.

22. A computer-readable medium containing instructions for controlling a computer system to perform a method for accessing server objects by a client, each of the server objects supporting an interface, and each of the server objects sharing an instance of the interface, the method performed by the client comprising the steps of:

requesting access to the interface of a first of the server objects;

receiving a first reference to the shared instance;

requesting access to the interface of a second of the server objects;

receiving a second reference to the shared instance;

utilizing the first reference to the shared instance of the interface to access the first server object; and utilizing the second reference to the shared instance of the interface to access the second server object.

23. A method in a computer system for providing access to objects of a program, wherein the objects support an interface, the method performed by the program comprising the steps of:

instantiating a plurality of the objects, each of the objects supporting the interface;

creating one instance of the interface; and exposing the created instance of the interface by each of the objects, wherein the instance is utilized by a caller when accessing each of the instantiated objects.

24. The method of claim 23 wherein the interface contains function members that perform functionality and that determine which among the objects is the selected object.

25. A method in a computer system for accessing server objects by a client, each of the server objects supporting an interface, and each of the server objects sharing an instance of the interface, the method performed by the client comprising the steps of:

requesting access to the interface of a first of the server objects;

receiving a first reference to the shared instance of the interface;

requesting access to the interface of a second of the server objects;

receiving a second reference to the shared instance of the interface;

utilizing the first reference to the shared instance of the interface to access the first server object; and utilizing the second reference to the shared instance of the interface to access the second server object.

* * * * *